United States Patent Office 2,841,607
Patented July 1, 1958

2,841,607
PROCESS OF PREPARING ALKANOLAMINE PHOSPHITES

Ingenuin Hechenbleikner, Clarksburg, and Albro T. Gaul, Adams, Mass., assignors to Shea Chemical Corporation, Jeffersonville, Ind., and Columbia, Tenn., a corporation of Tennessee No Drawing. Application May 21, 1956
Serial No. 585,954

5 Claims. (Cl. 260—461)

This invention relates to a novel method of preparing certain alkanolamine phosphites and to vinyl and vinylidene resins stabilized with such alkanolamine phosphites.

It is an object of the present invention to prepare alkanolamine phosphites in a simpler and more economical method than has been possible in the past.

It is another object of the invention to prepare halogen containing vinyl and vinylidene resin compositions showing improved resistance to discoloration on exposure to the action of heat or light.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished by partial trans-esterifying a tetiary aromatic phosphite having the formula

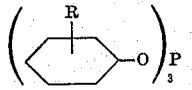

where R is selected from the group consisting of hydrogen, hydrocarbon and halogen with an alkanolamine having the formula $(HOCH_2CH_2)_2N-X$ where X is selected from the group consisting of $(HOCH_2CH_2-)$, a lower alkyl group and an aryl group to give a product having the formula

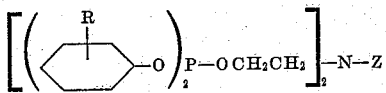

where R is the same as defined above and Z is selected from the group consisting of

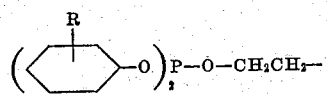

a lower alkyl group and an aryl group. In this reaction it is important not to use a significant excess of either the amine or the ester in order to obtain the best results. If an excess of amine is used, too many of the aromatic groups are removed from the starting phosphite, while if an excess of phosphite is employed, it is extremely difficult to separate the starting aromatic phosphite from the desired product. Therefore, when employing one mol of triethanolamine, there should be used 3 mols of the aromatic phosphite, while when using the alkyl or aryl diethanolamines, there should be used only 2 mols of the aromatic phosphite per mol of the alkanolamine.

As the starting phosphites there can be employed triphenyl phosphite, tri-4-chlorophenyl phosphite; tri-2-chlorophenyl phosphite; tri-3-chlorophenyl phosphite; tri-2-methylphenyl phosphite; tri-3-methylphenyl phosphite; tri-4-methylphenyl phosphite; the trimethylphenyl phosphite made by using a commercial meta-paracresol mixture as the starting material; tri-2-bromophenyl phosphite; tri-4-tert. butylphenyl phosphite; tri-2-tert. butylphenyl phosphite; tri-4-n-butylphenyl phosphite, tri-4-n-octylphenyl phosphite, tri-2-cyclohexylphenyl phosphite; 2,4-dimethylphenyl phosphite.

As the starting ethanolamines there can be used triethanolamine, methyl diethanolamine, ethyl diethanolamine, propyl diethanolamine, isopropyl diethanolamine, n-butyl diethanolamine, sec. butyl diethanolamine, tert. butyl diethanolamine, n-hexyl diethanolamine, phenyl diethanolamine, and p-cresyl diethanolamine.

The preferred starting materials are triphenyl phosphite and triethanolamine. As typical examples of materials which can be made according to the present invention there may be mentioned

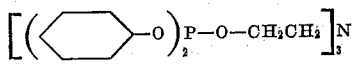

or imino tris(diphenyl ethylene phosphite);

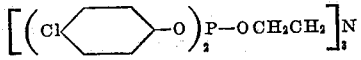

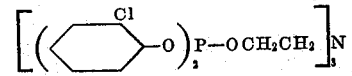

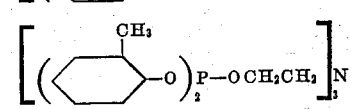

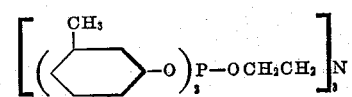

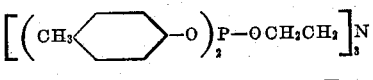

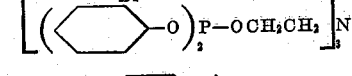

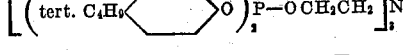

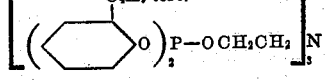

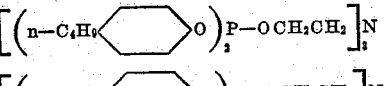

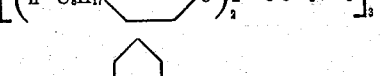

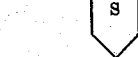

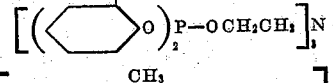

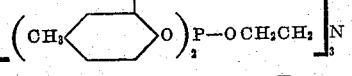

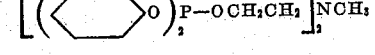

or methyl imino di(ethylenediphenyl phosphite);

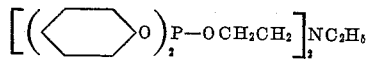

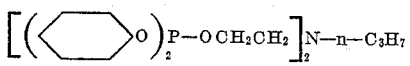

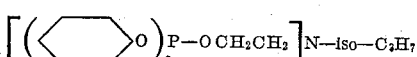

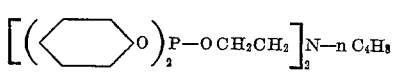

or n-butylimino di(ethylenediphenyl phosphite);

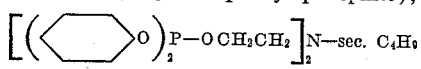

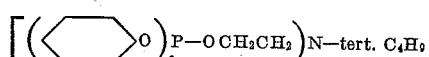

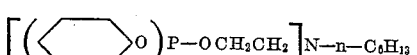

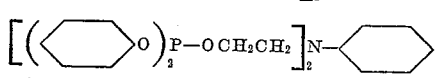

or phenylimino di(ethylene diphenyl phosphite);

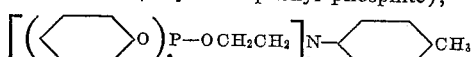

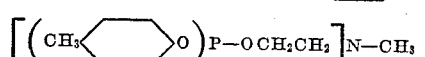

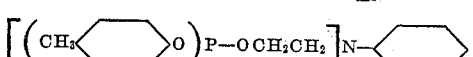

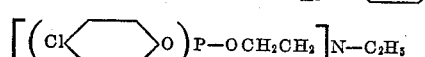

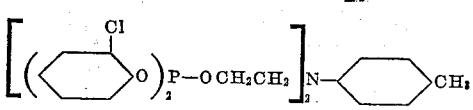

The reaction between the aromatic phosphite and the alkanolamine can be carried out at widely varying temperatures, e. g., from room temperature up to 100° C. or even reflux temperature in many instances. There is no need to use a catalyst, although it is desirable to use a basic catalyst soluble in the reaction medium. Typical catalysts are sodium phenate, pyridine, trialkyl amines, e. g., triethylamine, etc. When a catalyst is employed, it is preferably used in a small amount, e. g., 0.01 mol per mol of the alkanolamine.

*Example 1*

One mol of triethanolamine, 3 mols of triphenyl phosphite and 0.01 mol of sodium phenate were allowed to stand together at room temperature and atmospheric pressure for half an hour and then the mixture was heated to 120° C. at 10 mm. pressure until the phenol formed all distilled. The yield of phenol was substantially quantitative for removal of one of the phenyl groups from the triphenyl phosphite. The residue was the desired

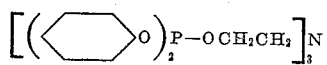

with a melting point below 0° C., $N_d^{25}$ of 1.58200; $D_4^{25}$ of 1.2092. The product was soluble in acetone, ether, toluene, benzene, glycol and most common solvents except water and aliphatic hydrocarbons.

*Example 2*

Example 1 was repeated without the use of the sodium phenate catalyst with a quantitative yield of the imino tris(diphenyl ethylene phosphite).

Any of the other alkanolamine phosphites set forth above can be prepared as set forth in Examples 1 and 2 by replacing the triphenyl phosphite by the appropriate other aromatic phosphite or by replacing the triethanolamine by the appropriate diethanolamine. As previously set forth, when replacing the triethanolamine by a diethanolamine, e. g., methyldiethanolamine, it also is important to use only 2 mols of the triaromatic phosphite, e. g., triphenyl phosphite, per mol of the diethanolamine. This is illustrated in the following example.

*Example 3*

One mol of n-butyl diethanolamine, 2 mols of triphenyl phosphite and 0.1 mol of sodium phenate were allowed to stand at room temperature and atmospheric pressure for one hour and then heated to 120° C. at 10 mm. until the phenol formed all distilled off. The residue was the desired

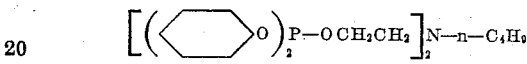

The phosphites prepared as described above, i. e., the phosphites obtained by partial trans-esterification of the tertiary aromatic phosphites with triethanolamine or the alkyl or aryl diethanolamines, have been found to be useful as heat and light stabilizers for halogen containing vinyl and vinylidene resins in which the halogen is attached directly to the carbon atoms in the polymer chain. Preferably the resin is a vinyl halide resin, specifically a vinyl chloride resin. Usually the vinyl chloride resin is made from monomers consisting of vinyl chloride alone or a mixture of monomers comprising a least 70% vinyl chloride by weight. The phosphite stabilizer is normally used in an amount of 0.05 to 20 parts per 100 parts of the vinyl chloride resin and preferably in an amount between 0.5 and 10 parts per 100 parts of resin.

As the chlorinated resin, there can be employed chlorinated polyethylene having about 14 to about 75% chlorine, e. g., 27% chlorine by weight, polyvinyl chloride, polyvinylidene chloride, polyvinyl bromide, polyvinyl fluoride, copolymers of vinyl chloride with 1 to 30% by weight copolymerizable materials such as vinyl acetate, vinylidene chloride, diethyl fumarate, diethyl maleate, and other alkyl fumarates and maleates, vinyl propionate, methyl acrylate, ethyl acrylate, butyl acrylate and other alkyl acrylates, methyl methacrylate, ethyl methacrylate, butyl methacrylate and other methacrylates, methyl alpha chloroacrylate, styrene, trichloroethylene, etc. Typical copolymers include vinyl chloride-vinyl acetate (95:5 weight ratio), vinyl chloride-vinyl acetate (87:13 weight ratio), vinyl chloride-vinyl acetate-maleic anhydride (86:13:1 weight ratio), vinyl chloride-vinylidene chloride (95:5 weight ratio), vinyl chloride-diethyl fumarate (95:5 weight ratio), vinyl chloride-trichloro-ethylene (95:5 weight ratio).

The vinyl and vinylidene polymers employed and copolymers can be formed by any of the conventional processes. Suitable methods include aqueous emulsion polymerization as well as organic solvent polymerization, etc.

The stabilizers of the present invention can be incorporated with the resins in conventional manner. Thus, they can be mixed together with or without a volatile solvent such as acetone and the resulting mixture milled on rolls at 100° to 160° C. until it is completely homogenized. To prevent discoloration due to heat, it is preferable to mix the resin and stabilizer thoroughly before heating. The stabilized resin is removed from the mill in the form of a sheet and can be used as such. In addition to the novel stabilizer, there can also be incorporated with the resin plasticizers, pigments, fillers and other conventional additives, either prior to or during the milling operation. If a plasticizer is employed, it is used in conventional amount, e. g., 40 to 150 parts per 100 parts of resin. Typical plasticizers are di-2-ethylhexyl phthalate, dibutyl sebacate, dioctyl sebacate, tricresyl phosphate, etc.

Example 4

100 parts by weight of polyvinyl chloride, 40 parts by weight dioctyl sebacate and 5 parts by weight of

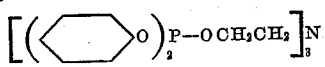

were thoroughly mixed and then homogenized by working on a roll mill heated at 145° C. for 3 minutes. The composition thus produced was removed in the form of a colorless sheet. This sheet proved resistant to color changes, e. g., on exposure to sunlight or upon being subjected to 160° C. for 5 minutes. Without the phosphite a control sample seriously discolored under these testing conditions.

Example 5

100 parts of a copolymer of 85% by weight vinyl chloride and 15% of vinyl acetate was similarly mixed and homogenized with 5 parts by weight of the phosphite used in Example 4 on the roll mill heated to 150° C. for 3 minutes. The resulting sheet was resistant to discoloration upon subsequent heating to 160° C. for 5 minutes.

In place of the particular phosphite employed in Examples 4 and 5, there can be employed any of the other alkanolamine phosphites set forth above. Typical examples of such phosphites are

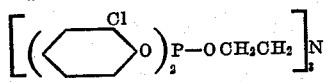

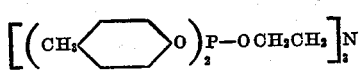

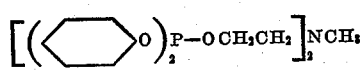

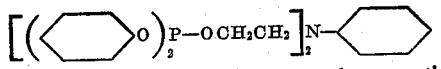

Unless otherwise stated all parts and proportions in the present specification and claims are by weight.

We claim:
1. A process of preparing a compound having the formula

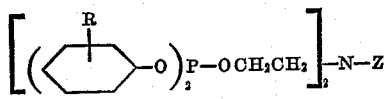

where Z is selected from the group consisting of

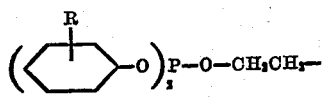

a lower alkyl group and an aryl group, and R is selected from the group consisting of hydrogen, hydrocarbon and halogen comprising trans-esterifying a compound having the formula

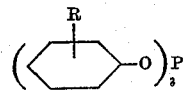

with an alkanolamine having the formula $$(HOCH_2H_2)_2N—Z$$

2. A process of preparing a compound having the formula

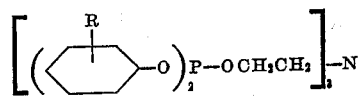

where R is selected from the group consisting of hydrogen, hydrocarbon and halogen comprising trans-esterifying a phosphite having the formula

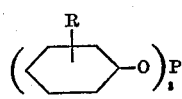

with triethanolamine.

3. A process according to claim 2 wherein about 3 mols of the phosphite are heated with about one mol of the triethanolamine.

4. A process comprising condensing about 2 mols of a phosphite having the formula

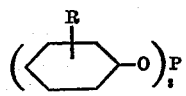

where R is selected from the group consisting of hydrogen, hydrocarbon and halogen with one mol of a compound having the formula $(HOCH_2CH_2)N—Y$ where Y is selected from the group consisting of lower alkyl and aryl.

5. A process comprising condensing 3 mols of triphenyl phosphite with one mol of triethanolamine.

References Cited in the file of this patent

UNITED STATES PATENTS

| | | |
|---|---|---|
| 2,175,509 | Rogers et al. | Oct. 10, 1939 |
| 2,241,244 | Conary et al. | May 6, 1941 |
| 2,516,945 | Barney | Aug. 1, 1950 |
| 2,555,167 | Van Dijk | May 29, 1951 |